United States Patent
Shaharabany et al.

(10) Patent No.: US 9,852,066 B2
(45) Date of Patent: Dec. 26, 2017

(54) SYSTEMS AND METHODS OF ADDRESS-AWARE GARBAGE COLLECTION

(71) Applicant: SANDISK TECHNOLOGIES INC., Plano, TX (US)

(72) Inventors: Amir Shaharabany, Kochav Yair (IL); Alon Marcu, Tel-Mond (IL); Hadas Oshinsky, Kfar Saba (IL)

(73) Assignee: SanDisk Technologies LLC, Plano, TX (US)

( * ) Notice: Subject to any disclaimer, the term of this patent is extended or adjusted under 35 U.S.C. 154(b) by 161 days.

(21) Appl. No.: 14/323,553

(22) Filed: Jul. 3, 2014

(65) Prior Publication Data

US 2015/0178194 A1   Jun. 25, 2015

Related U.S. Application Data

(60) Provisional application No. 61/919,580, filed on Dec. 20, 2013.

(51) Int. Cl.
   *G06F 12/02* (2006.01)
(52) U.S. Cl.
   CPC .................. *G06F 12/0253* (2013.01)
(58) Field of Classification Search
   None
   See application file for complete search history.

(56) References Cited

U.S. PATENT DOCUMENTS

| | | | |
|---|---|---|---|
| 2004/0083348 A1* | 4/2004 | Chang | G06F 12/0246 711/202 |
| 2010/0037009 A1* | 2/2010 | Yano | G06F 12/0246 711/103 |
| 2010/0169542 A1* | 7/2010 | Sinclair | G06F 12/0246 711/103 |
| 2010/0185830 A1* | 7/2010 | Asnaashari | G06F 3/0608 711/206 |
| 2011/0099326 A1 | 4/2011 | Jung et al. | |
| 2012/0110239 A1* | 5/2012 | Goss | G06F 12/0246 711/103 |
| 2012/0297121 A1 | 11/2012 | Gorobets et al. | |
| 2013/0159609 A1* | 6/2013 | Haas | G06F 12/0246 711/103 |
| 2013/0166818 A1* | 6/2013 | Sela | G06F 12/0246 711/103 |

* cited by examiner

*Primary Examiner* — Yaima Rigol
(74) *Attorney, Agent, or Firm* — Toler Law Group, PC

(57) ABSTRACT

A method includes determining a first logical block address (LBA) range of a first set of data units of a first candidate block of the memory. The method also includes determining a second LBA range of a second set of data units of a relocation block of the memory. The method also includes determining that the first LBA range matches the second LBA range. The method further includes relocating first valid data of the first candidate block to the relocation block of the memory in response to determining that the first LBA range matches the second LBA range, where the first LBA range corresponds to multiple LBAs.

20 Claims, 6 Drawing Sheets

US 9,852,066 B2

SYSTEMS AND METHODS OF ADDRESS-AWARE GARBAGE COLLECTION

REFERENCE TO PRIOR APPLICATIONS

This application claims the benefit of U.S. Provisional Patent Application No. 61/919,580 filed Dec. 20, 2013, which is incorporated here by reference in its entirety

FIELD OF THE DISCLOSURE

The present disclosure is generally related to address-aware garbage collection at a data storage device.

BACKGROUND

A host device and a data storage device may use different address spaces. For example, the host device may send data to the data storage device and may indicate that the data is to written to a particular logical address. A logical-to-physical mapping table may be used to coordinate translation of logical addresses to physical addresses and vice versa.

Over time, data stored at the data storage device may become fragmented, with related data stored at many different logical and physical locations of the data storage device. The file system device or the storage device internally may use a garbage collection process to aggregate valid data together in blocks to provide an empty block. Performing the garbage collection process uses resources of the data storage device, which can degrade performance and endurance of the data storage device.

SUMMARY

In a particular embodiment, a data storage device utilizes an address-aware garbage collection process. The address-aware garbage collection process uses logical block address (LBA) ranges or representative LBAs to identify candidate blocks of memory that may include related data. Using the LBA ranges or the representative LBAs for address-aware garbage collection decreases memory fragmentation as compared to using a Greedy algorithm based process. Additionally, using the LBA ranges or the representative LBAs for address-aware garbage collection improves processing time as compared to comparing individual LBAs associated with each data unit of the data storage device.

In a particular embodiment, a method is performed at a data storage device that includes a controller and a memory. The method includes determining a first logical block address (LBA) range corresponding to LBAs of a first set of data units of a first candidate block of the memory. The method also includes determining a second LBA range corresponding to LBAs of a second set of data units of a relocation block of the memory. The method also includes determining that the first LBA range matches the second LBA range. The method further includes relocating the first valid data of the first candidate block to a relocation block of the memory in response to determining that the first LBA range matches the second LBA range, where the first LBA range corresponds to multiple LBAs.

In another particular embodiment, a data storage device includes a controller and a memory coupled to the controller. The controller is configured to determine a first logical block address (LBA) range corresponding to LBAs of a first set of data units of a first candidate block of the memory. The controller is also configured to determine a second LBA range corresponding to LBAs of a second set of data units of a relocation block of the memory. The controller is also configured to determine that the first LBA range matches the second LBA range. The controller is further configured to relocate the first valid data of the first candidate block to the relocation block of the memory in response to determining that the first LBA range matches the second LBA range, where the first LBA range corresponds to multiple LBAs.

DETAILED DESCRIPTION

Figure 1:
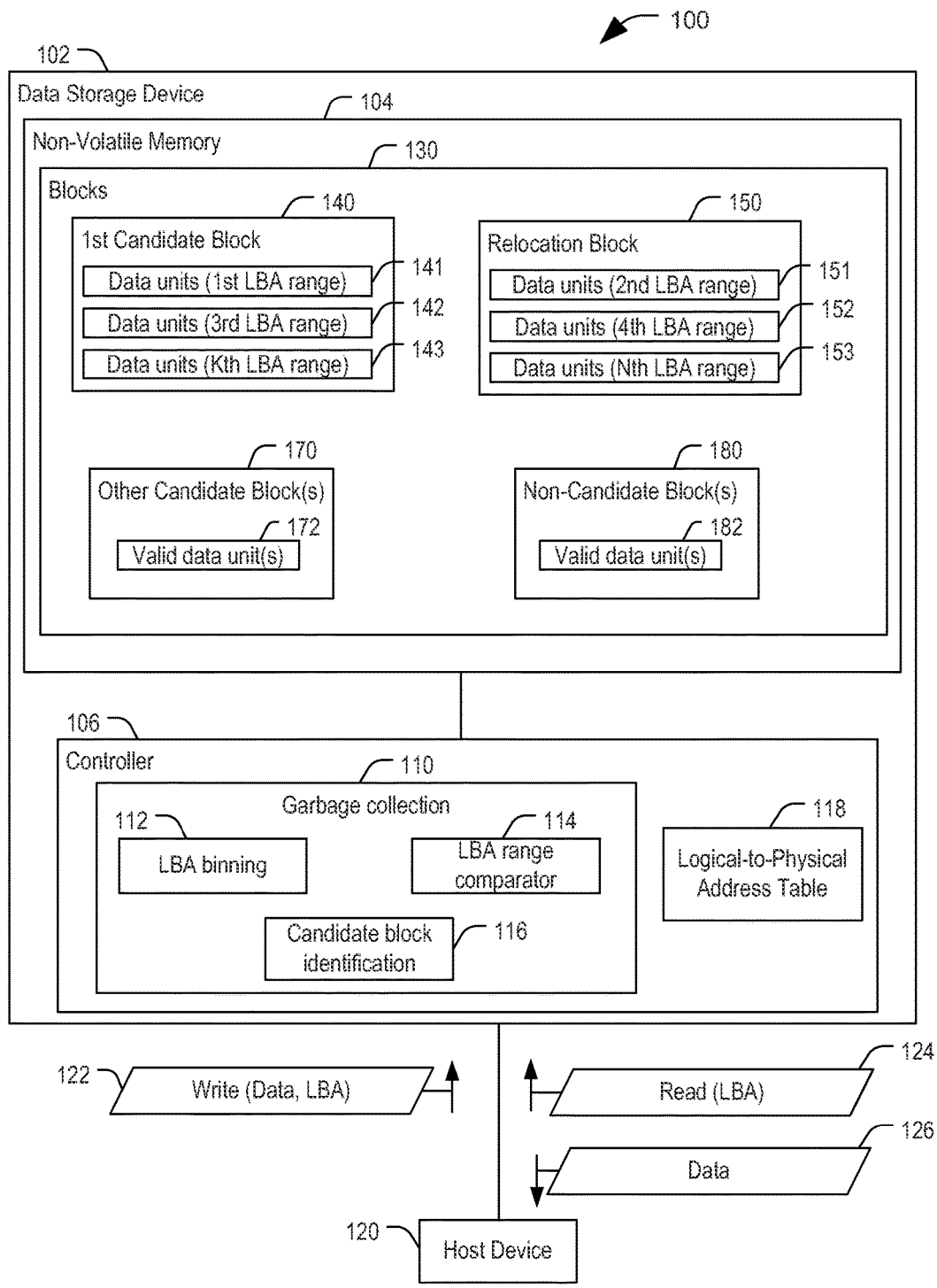
FIG. 1 is a block diagram of a particular embodiment of a system including a data storage device configured to perform address-aware garbage collection.

FIG. 1 is a block diagram of a particular embodiment of a system 100 including a data storage device 102 configured to perform address-aware garbage collection. The data storage device 102 includes a controller 106 and a memory 104 (e.g., a non-volatile memory). In a particular implementation, the memory 104 is on a memory die that is separate from the controller 106, and the memory 104 is coupled to the controller 106 via a bus. In other implementations, the memory 104 and the controller 106 may be on a common die.

The memory 104 may be a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a Resistive Random Access Memory (RRAM or ReRAM), a one-time programmable memory (OTP), or any other type of memory.

The data storage device 102 may be configured to interface with a host device 120. The host device 120 may be configured to provide data to the data storage device 102 for storage at the memory 104 and to request data to be read from the memory 104. For example, the host device 120 may include a mobile telephone, a music player, a video player, a gaming console, an electronic book reader, a personal digital assistant (PDA), a computer, such as a laptop computer, notebook computer, or tablet, any other electronic device, or any combination thereof. The host device 120 communicates via a memory interface that enables reading from the data storage device 102 and writing to the data storage device 102. For example, the host device 120 may operate in compliance with a Joint Electron Devices Engineering Council (JEDEC) industry specification, such as an eMMC specification. As other examples, the host device 120 may operate in compliance with a USB or a UFS specification. The host device 120 may communicate with the data storage device 102 in accordance with any other suitable communication protocol.

In a particular embodiment, the data storage device 102 is configured to be coupled to the host device 120 as embedded memory. In another particular embodiment, the data storage device 102 is a removable device that is coupled to the host device 120. For example, the data storage device 102 may be a memory card. The data storage device 102 may operate in compliance with a JEDEC industry specification, one or more other specifications, or a combination thereof. For example, the data storage device 102 may operate in compliance with an eMMC specification, in compliance with a USB or a UFS specification, or a combination thereof.

The data storage device 102 is configured to receive data from the host device 120 for storage at the memory 104. For example, the host device 120 may send a write instruction 122 including data and identifying an address (e.g., a logical block address) at which to write the data. In response to the write instruction 122, the data storage device 102 may write the data to the memory 104 at a physical location corresponding to the address (e.g., based on a logical-to-physical address table 118).

The data storage device 102 is also configured to send data to the host device 120. For example, the host device 120 may send a read instruction 124 to the data storage device 102. The read instruction 124 may identify an address (e.g., a logical block address) that is to be read. In response to the read instruction 124, the data storage device 102 may read data from the memory 104 at a physical location corresponding to the address (e.g., based on the logical-to-physical address table 118). The data storage device 102 may send the data 126 to the host device 120.

In a particular embodiment, the memory 104 is divided into a plurality of blocks 130. The blocks 130 represent physical storage locations of the memory 104. A block may correspond to a smallest unit of the memory 104 that can be erased. Each of the blocks 130 may include multiple data units, such as words, word lines, pages, or other data units. A data unit may correspond to a smallest unit of the memory 104 that can be written.

The controller 106 of the data storage device 102 may be configured to perform a garbage collection process. The garbage collection process may consolidate valid data into particular blocks, thereby freeing other blocks to be erased. In a particular embodiment, the garbage collection process is address-aware. That is, the controller 106 performs the garbage collection process in a manner that accounts for logical addresses associated with particular data units in order to group or consolidate related data within the memory 104.

The controller 106 may include a garbage collection module 110. The garbage collection module 110 may include application specific circuitry or may correspond to software or firmware executable by a processor of the controller 106. During the garbage collection process, the garbage collection module 110 may identify candidate blocks of the set of blocks 130 of the memory 104. The candidate blocks are a subset of the blocks 130 of the memory 104. The candidate blocks correspond to those blocks of the memory 104 that have characteristics that make them candidates for consolidation.

In a particular embodiment, the candidate blocks include a subset of the blocks 130 that have fewest valid data units. For example, a candidate block identification module 116 of the controller 106 may determine a number of valid data units stored at each of the blocks 130. Valid data units include data units that are not marked for deletion and are not marked as invalid. The candidate block identification module 116 may select a set of candidate blocks based on which of the blocks 130 have the fewest valid data units. For example, in the embodiment illustrated in FIG. 1, a plurality of candidate blocks has been identified. The candidate blocks include a first candidate block 140 having valid data units 141-143, a relocation block 150 having valid data units 151-153, and other candidate blocks 170 having valid data units 172. Each of the candidate blocks 140, 150, 170 may have fewer valid data units than a number of valid data units 182 of each non-candidate block 180. In a particular embodiment, the relocation block 150 is not a member of the set of candidate blocks. For example, the relocation block 150 may be an empty block.

A number of blocks included in the set of candidate blocks may be determined based on a quantity of the memory 104 that is to be freed for deletion by the garbage collection process. For example, as described above, a block corresponds to a smallest unit of the memory 104 that can be erased. Accordingly, to free a block for erasure, valid data of the block is moved to another block. The garbage collection process aggregates valid data into certain blocks (e.g., the relocation block 150) to be left with a single block or set of blocks for erasure, because obsoleted data units are not relocated in the aggregation process. Thus, the set of candidate blocks may include a sufficient number of blocks such that relocation of valid data from the set of candidate blocks results in at least one block for erasure. To illustrate, if each block has a size of 4 k bits, where each bit represents a data unit valid flag, the set of candidate blocks includes enough candidate blocks to include at least 4 k bits of invalid data. Thus, if each candidate block is 75% full of valid data and includes 25% invalid data, the set of candidate blocks includes at least four (4) candidate blocks (i.e., 4*25%=100%).

The garbage collection module 110 also includes a logical block address (LBA) binning module 112. The LBA binning module 112 is configured to assign data units of each candidate block to a corresponding LBA range based on the LBA of the data unit. Each LBA range corresponds to multiple logical block addresses. For example, a first data unit 141 of the first candidate block 140 may be associated with a first LBA range, a second data unit 151 of the relocation block 150 may be associated with a second LBA range, a third data unit 142 of the first candidate block 140 may be associated with a third LBA range, a fourth data unit 152 of the relocation block 150 may be associated with a fourth LBA range, a Kth data unit 143 of the first candidate block 140 may be associated with a Kth LBA range, and an Nth data unit 153 of the relocation block 150 may be associated with an Nth LBA range (where K and N represent positive integer values). As described with reference to FIG. 2, each LBA range may correspond to hundreds or thousands of LBAs.

In a particular embodiment, the LBA binning module 112 may assign a representative LBA range (e.g., associated with one of the LBA ranges) or a representative LBA identifier to one or more of the candidate blocks. A representative LBA range (or a representative LBA identifier) may be assigned to a candidate block when at least a threshold number of data units of the candidate block are associated with a single LBA range. For example, if the threshold is 200 data units and if 200 or more data units of the first candidate block 140 are associated with the first LBA range, the first LBA range is assigned as a representative LBA range of the first candidate block 140. Conversely, if the threshold is 200 data units and only 190 data units of the first candidate block 140 are associated with the first LBA range, the first LBA range is not assigned as a representative LBA range of the first candidate block 140. Thus, a representative LBA range indicates that a particular LBA range is strongly represented in the data units of a candidate block. In at least one implementation, more than one representative LBA range may be assigned to each candidate block. For example, if the threshold is 200 data units and if 200 or more data units of the first candidate block 140 are associated with the first LBA range and 200 or more other data units of the first candidate block 140 are associated with the third LBA range, the first LBA range and the third LBA range are each assigned as a representative LBA range of the first candidate block 140.

The garbage collection module 110 may also include an LBA range comparator 114. The LBA range comparator 114 is configured to compare LBA ranges (or representative LBA ranges) of different candidate blocks to identify candidate blocks that have related data (e.g., data associated with the same LBA range or representative LBA range). Use of representative LBA ranges may simplify and speed up comparison of the LBA ranges. For example, in a particular implementation, each of the blocks 130 may represent about four thousand LBAs. Thus, comparing two candidate blocks data unit by data unit to identify sequential LBAs or LBAs that are near one another in some other manner could include, depending on a number of valid data units in each candidate block, comparing up to four thousand data units of one candidate block to up to four thousand other data units of the other candidate block. Using LBA ranges reduces this comparison process significantly, depending on the size of each LBA ranges. Using representative LBA ranges reduces that comparison process even further by only using LBA ranges that are representative of a significant portion of the data units (e.g., at least the threshold number of the data units). Thus, by using LBA ranges, the LBA range comparator 114 can search for related data more quickly than by using a data unit by data unit process, and by using representative LBA ranges (or representative LBA range identifiers), the process can be performed even more quickly.

During a garbage collection process, the candidate block identification module 116 may identify a set of candidate blocks of the blocks 130. For example, returning to FIG. 1, the first candidate block 140 and the other candidate blocks 170 have been identified as candidate blocks. The relocation block 150 may also be a member of the set of candidate blocks. Additionally or in the alternative, the candidate block identification module 116 may identify other blocks as non-candidate blocks (e.g., the non-candidate blocks 180).

After identifying the set of candidate blocks, the LBA binning module 112 may determine logical block addresses of each valid data unit of each of the candidate blocks. For example, the LBA binning module 112 may use the logical-to-physical address table 118 to determine logical block addresses associated with each data unit of each candidate block. The LBA binning module 112 may also associate each of the data units with a corresponding LBA range based on the LBA associated with the data unit in the logical-to-physical address table 118.

In a particular embodiment, the LBA binning module 112 assigns one or more representative LBA ranges to the candidate blocks based on a number of data units associated with each LBA range. As explained above, a representative LBA range may be assigned when the number of data units of a particular candidate block that are associated with a particular LBA range satisfies the threshold number. For example, the first data units 141 of the first candidate block 140 may be assigned to a representative LBA range if a sufficient number (e.g., at least a threshold number) of the first data units 141 are within a LBA range corresponding to the representative LBA range.

After identifying the LBA ranges or the representative LBA ranges, the LBA range comparator 114 may compare LBA ranges associated with two or more blocks. For example, the LBA range comparator 114 may compare LBA ranges associated with the first candidate block 140 and LBA ranges associated with the relocation block 150. The first candidate block 140 and the relocation block 150 may be selected from among the other candidate blocks 170 for comparison based on a number of valid data units at the first candidate block 140 and a number of valid data units at the relocation block 150. For example, the first candidate block 140 may have fewest valid data units among the set of candidate blocks, and the relocation block 150 may have the second fewest valid data units among the set of candidate blocks. Alternatively, the first candidate block 140 and the relocation block 150 may be selected from among the candidate blocks based on a number of data units associated with an LBA range of each candidate block. For example, the first candidate block 140 may have a largest number of data units associated with any particular LBA range (e.g., the first LBA range) among the set of candidate blocks, and the relocation block 150 may have a second largest number of data units 151 associated with any particular LBA range (e.g., the second LBA range). Thus, the first candidate block 140 may have more data units that are associated with a single LBA range than any other candidate blocks, and the relocation block 150 may have more data units that are associated with a single LBA range than any other candidate block except for the first candidate block 140.

Valid data units of the first candidate blocks 140 may be relocated to the relocation block 150 if the first candidate block 140 has data related to data of the relocation block 150 (e.g., one or more of the data units 141-143 are associated with the same LBA range or representative LBA range as one or more of the data units 151-153). Thus, the LBA range comparator 114 may compare LBA ranges of data units of the first candidate block 140 and LBA ranges of the relocation block 150. For example, the LBA range comparator 114 may search for matches between the LBA ranges (or representative LBA range identifiers) of the first candidate block 140 and the LBA ranges (or representative LBA range identifiers) of the relocation block 150. To illustrate, the LBA range comparator 114 may compare the first LBA range of the first data units 141 to the second LBA range of the second data units 151. Valid data units of the first candidate block 140 may be relocated to the relocation block 150 if the first LBA range matches the second LBA range. In a particular embodiment, the valid data units of the first candidate block 140 may be relocated to the relocation block 150 if more than one LBA range of the first candidate block 140 matches more than one LBA range of the relocation block 150.

After valid data units are copied from the first candidate block 140 to the relocation block 150, the valid data bits are marked as invalid at the first candidate block 140. If the relocation block 150 does not have enough capacity for all of the valid data units of the first candidate block 140, another relocation block (not shown) may be selected to receive remaining valid data units. When the all of the valid data units of the first candidate block 140 have been copied to one or more relocation blocks, the first candidate block 140 is prepared for erasure or re-use. The garbage collection module 110 may proceed to select additional candidate blocks from the other candidate blocks 170 for relocation until the garbage collection process is complete.

In a particular embodiment, rather than copying valid data units from one candidate block (e.g., the first candidate block 140) at a time to the relocation block 150, the valid data units of more than one candidate block may be copied to the relocation block 150 concurrently. For example, the LBA range comparator 114 may compare LBA ranges (or representative LBA identifiers) of the first candidate block 140 to LBA ranges (or representative LBA identifiers) of another candidate block. If the LBA ranges (or representative LBA identifiers) of the first candidate block 140 overlap with (e.g., include one or more matches with) the LBA ranges (or representative LBA identifiers) of the other candidate block, the valid data units of the first candidate block 140 and valid data units of the other candidate block may be copied to another block, such as the relocation block 150.

Accordingly, the garbage collection module 110 enables the data storage device 102 to perform address-aware garbage collection. The address-aware garbage collection may utilize LBA ranges or representative LBAs to improve processing time as compared to comparing individual logical block addresses associated with each data unit.

Figure 2:
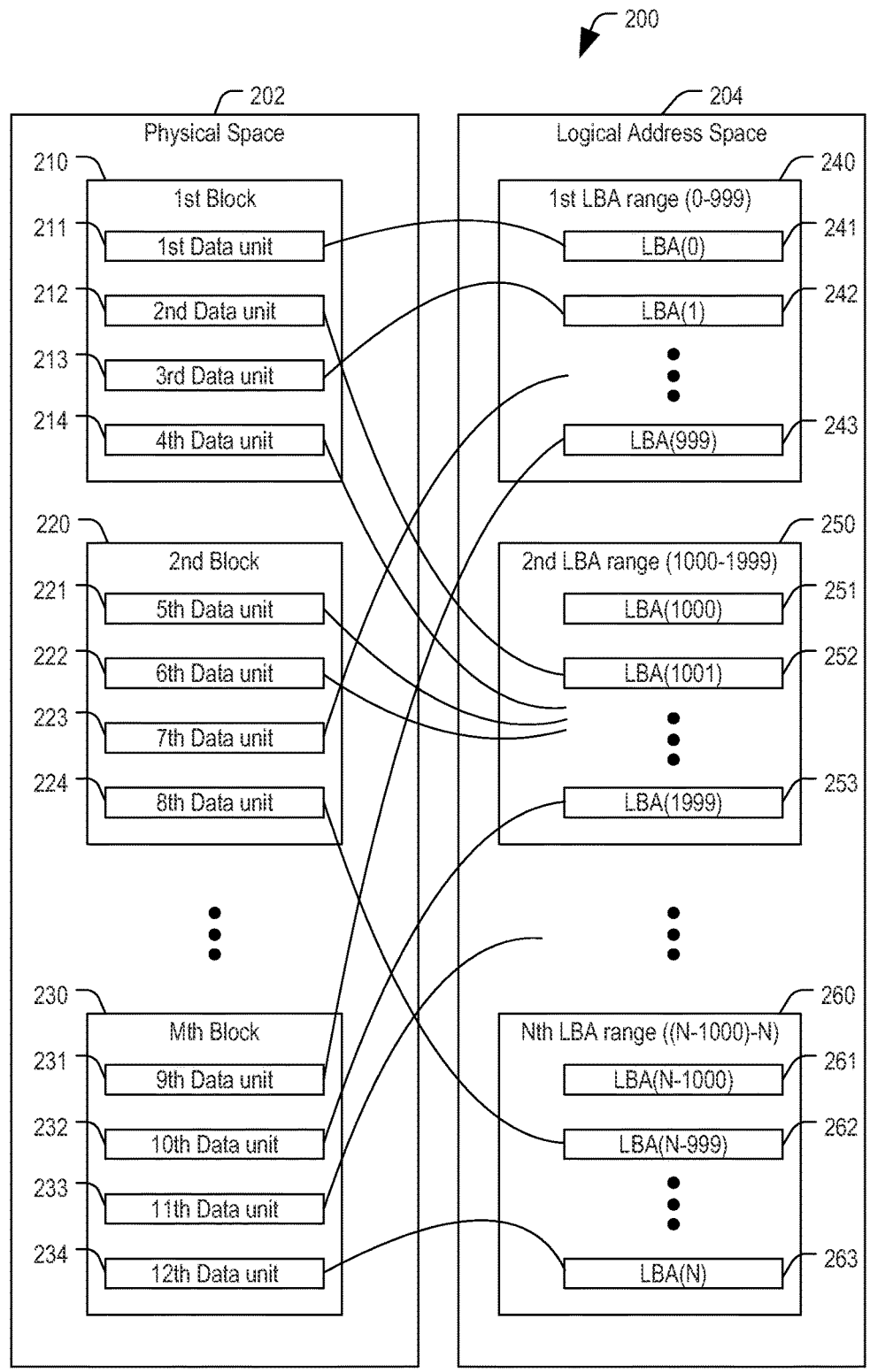
FIG. 2 is a diagram illustrating a particular embodiment of binning data units into corresponding logical block address (LBA) ranges.

FIG. 2 is a diagram illustrating a particular embodiment of a method of binning data units into corresponding logical block address (LBA) ranges. In FIG. 2, a system 200 includes a physical space 202 and a logical address space 204. The physical space 202 corresponds to physical storage elements or storage locations of a memory, such as the memory 104 of FIG. 1. The logical address space 204 corresponds to LBAs used by a host device, such as the host device 120 of FIG. 1, to address memory locations within a memory.

The physical space 202 may include a plurality of blocks, such as a first block 210, a second block 220, one or more additional blocks (not shown), and an Mth block 230 (where M is an integer greater than 2). Each block may correspond to a smallest erasable unit of the memory. The logical address space 204 may include a plurality of logical block addresses, such as logical block addresses 241-243, logical block addresses 251-253, additional logical block addresses (not shown), and logical block addresses 261-263. The logical block addresses of the logical address space 204 may be divided into LBA ranges. For example, the logical block addresses 141-143 correspond to a first logical block address range 240, the logical block addresses 251-253 correspond to a second logical block address range 250, and the logical block addresses 261-263 correspond to an Nth logical block address range 260 (where N is an integer). In the embodiment illustrated in FIG. 2, each LBA range corresponds to one thousand (1000) logical block addresses; however, in other embodiments, each LBA range may correspond to more than or fewer than one thousand logical block addresses. For example, a 32 Gb memory may be represented by 320 LBA ranges when each LBA range corresponds to 100 Kb.

Each data unit stored at a block in the physical space 202 is mapped (e.g., in the logical-to-physical address table 118 of FIG. 1) to a LBA in the logical address space 204. For example, in the first block 210, a first data unit 211 corresponds to a logical block address (0) 241. A second data unit 212 corresponds to logical block address (1001) 252. A third data unit 213 corresponds to logical block address (1) 242. A fourth data unit 214 corresponds to a logical block address (not shown) in the second LBA range 250. In the second block 220, a fifth data unit 221 corresponds to a logical block address (not shown) in the second LBA range 250. A sixth data unit 222 corresponds to a logical block address (not shown) in the second logical block address range 250. A seventh data unit 223 corresponds to a logical block address (not shown) in the first LBA range 240. An eighth data unit 224 corresponds to a logical block address (N-999) 262. In the Mth block 230, a ninth data unit 231 corresponds to logical block address (999) 243 in the first logical block address range 240. A tenth data unit 232 corresponds to a logical block address (1999) 253 in the second logical block address range 250. An eleventh data unit 233 corresponds to a logical block address (not shown) in a logical block address range (not shown) between the second LBA range 250 and the Nth LBA range 260. A twelfth data unit 234 corresponds to a logical block address (N) 263 in the Nth LBA range 260.

Based on the mapping illustrated in FIG. 2, the first block 210 includes data units that map to logical addresses in the first LBA range 240 and data units that map to logical addresses in the second LBA range 250. Thus, the first LBA range 240 and the second LBA range 250 may be associated with the first block 210. Similarly, the second block 220 includes data units that map to logical addresses in the second LBA range 250, the first LBA range 240, and the Nth LBA range 260. Additionally, the Mth block 230 includes data units that map to logical addresses in the first LBA range 240, the second LBA range 250, another LBA range (not shown), and the Nth LBA range 260.

In a particular embodiment, LBA ranges, such as the LBA ranges 240, 250, 260 of FIG. 2, may be used to facilitate address-aware garbage collection. To illustrate, the LBA ranges may be used to quickly determine whether a particular block includes data that is likely to be related to data of another block. For example, the first block 210 includes two data units mapped to the second LBA range 250, the second block 220 includes two data units mapped to the second LBA range 250, and the Mth block 230 include one data unit mapped to the second LBA range 250. Accordingly, an address-aware garbage collection process may determine that data of the first block 210 is more likely to be related to data of the second block 220 than to data of the Mth block 230. Thus, valid data of the first block 210 and valid data of the second block 220 may be selected for relocation to a relocation block.

The LBA ranges of FIG. 2 may be used to illustrate assignment of representative LBA ranges. For purposes of illustration, the threshold number of data units may be set to two. That is, a representative LBA may be assigned to a block if the block has two or more data units associated with a corresponding LBA range. In FIG. 2, the first block 210 includes two data units mapped to the first LBA range 240 and two data units mapped to the second LBA range 250. Thus, the first LBA range 240 and the second LBA range 250 may be assigned as representative LBA ranges of the first block 210. The second block 220 includes two data units mapped to the second LBA range 250, one data unit mapped to the first LBA range 240, and one data unit mapped to the Nth LBA range 260. Thus, the second LBA range 250 may be assigned as a representative LBA range of the second block 220. The Mth block 230 includes one data unit mapped to the first LBA range 240, one data unit mapped to the second LBA range 250, one data unit mapped to another LBA range (not shown), and one data unit mapped to the Nth LBA range 260. Thus, no LBA range may be assigned as a representative LBA range of the Mth block 230. Although a threshold number of data units of two is used in this example, the threshold number of data units may be more than two.

In an embodiment where representative LBA ranges are used, the representative LBA ranges (or representative LBA range identifiers) may facilitate address-aware garbage collection. To illustrate, in the example described above, the first block 210 is associated with two representative LBA ranges (e.g., the first LBA range 240 and the second LBA range 250), the second block 220 is associated with one representative LBA range (e.g., the second LBA range 250), and the Mth block 230 is not associated with any representative LBA range. A representative LBA range (e.g., the second LBA range 250) of the first block 210 matches the representative LBA range of the second block 220 (e.g., the second LBA range 250). Accordingly, the address-aware garbage collection process may determine that data of the first block 210 is more likely to be related to data of the second block 220 than to data of the Mth block 230. Thus, valid data of the first block 210 may be selected for relocation to the second block 220, or valid data of the second block 220 may be selected for relocation to the first block 210. In another example, the valid data of the first block 210 and the valid data of the second block 220 may be selected for relocation to another block (not shown).

Figure 3:
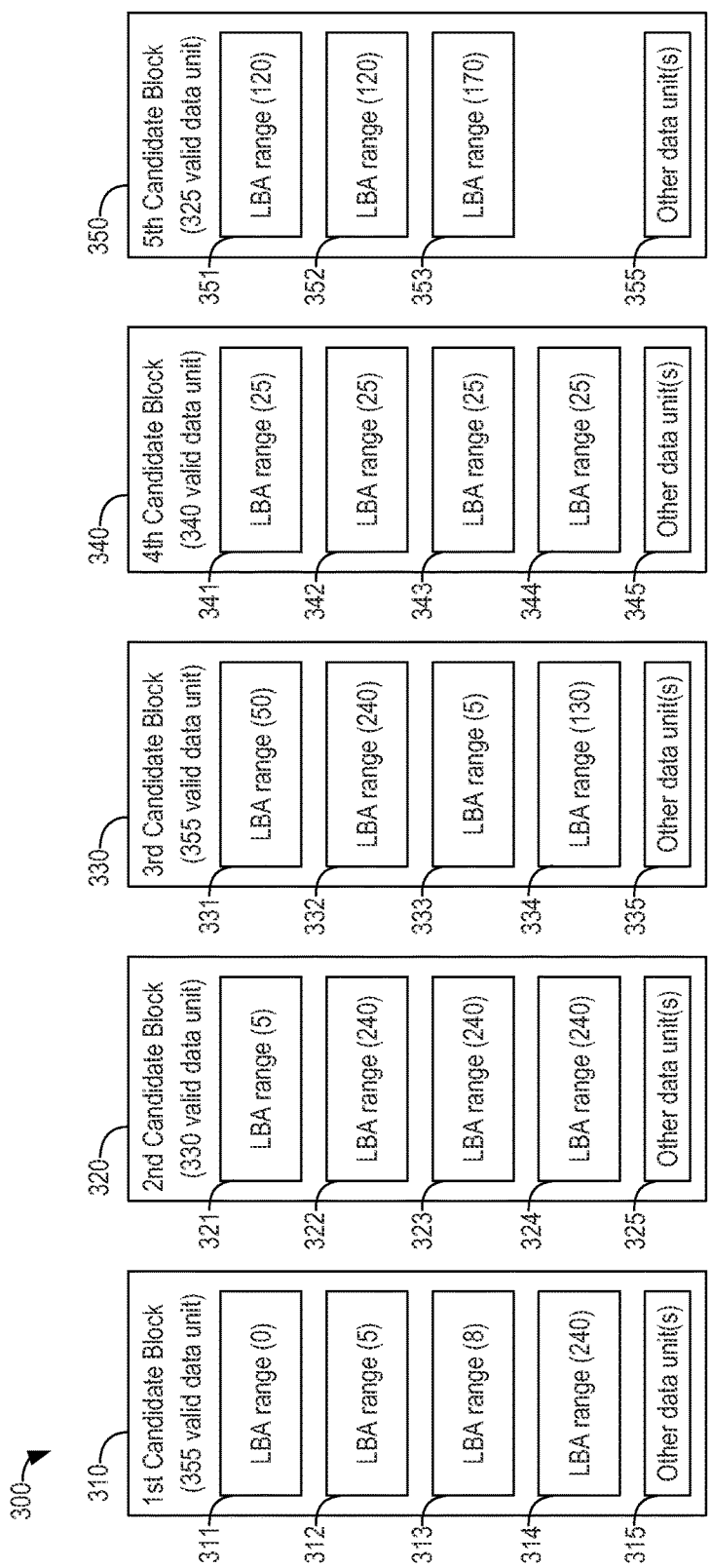
FIG. 3 is a diagram illustrating a particular embodiment of a set of candidate blocks of a memory at a data storage device.

FIG. 3 is a diagram illustrating a particular embodiment of a set of candidate blocks 300 of a memory at a data storage device. In a particular embodiment, the memory is the memory 104 of FIG. 1 and the set of candidate blocks 300 includes the first candidate block 140, the relocation block 150, and the other candidate blocks 170. In FIG. 3, the set of candidate blocks 300 includes a first candidate block 310, a second candidate block 320, a third candidate block 330, a fourth candidate block 340, and a fifth candidate block 350. The set of candidate blocks 300 may be used to illustrate address-aware garbage collection, such as the garbage collection process implemented by the garbage collection module 110 of FIG. 1.

In FIG. 3, each candidate block of the set of candidate blocks 300 has one or more valid data units. For example, the first candidate block 310 includes 355 valid data units, the second candidate block 320 includes 330 valid data units, the third candidate block 330 includes 355 valid data units, the fourth candidate block 340 includes 340 valid data units, and the fifth candidate block 350 includes 325 valid data units. Each valid data unit may be associated with an LBA range corresponding to an LBA associated with the valid data unit. If a particular candidate block has at least a threshold number of data units associated with a particular LBA range, the particular LBA range may be designated as a representative LBA range of the particular candidate block. The particular candidate block may also include other data units associated with other LBA ranges that are not designated as representative LBA ranges. For example, if a second particular LBA ranges is associated with fewer than the threshold number of data units, the second particular LBA ranges is not designated as a representative LBA ranges.

In FIG. 3, representative LBA ranges are associated with each of the candidate blocks. For example, the first candidate block 310 includes first data units 311 that are associated with an LBA range (0). The first data units 311 include at least a threshold number of data units with logical addresses within a LBA range that corresponds to the LBA range (0). Thus, the LBA range (0) is designated a representative LBA range of the first candidate block 310. The first candidate block 310 also includes second data units 312 associated with an LBA range (5). The second data units 312 include at least the threshold number of data units with logical addresses within a LBA range that corresponds to the LBA range (5). Thus, the LBA range (5) is designated a representative LBA range of the first candidate block 310. Similarly, the first candidate block 310 includes third data units 313 associated with representative LBA range (8) and fourth data units 314 associated with representative LBA range (240). The first candidate block 310 may also include other data units 315 that include fewer than the threshold number of data units per LBA range.

The second candidate block 320 includes data units 321-324 that are associated with corresponding representative LBA ranges and includes other data units 325 that are not associated with a representative LBA range. The third candidate block 330 includes data units 331-334 that are associated with representative LBA ranges and includes other data units 335 that are not associated with representative LBA ranges. The fourth candidate block 340 include data units 341-344 that are associated with representative LBA ranges and includes other data units 345 that are not associated with a representative LBA range. The fifth candidate block 350 includes data units 351-353 associated with representative LBA ranges and includes other data units 355 that are not associated with particular representative LBA ranges.

A simple garbage collection process, such as a garbage collection process that use a Greedy algorithm, may identify blocks that have a fewest number of valid data units for relocation. As an example, if three candidate blocks need to be consolidated to a relocation block to free memory for erasure or re-use, a Greedy algorithm would select the fifth candidate block 350, the second candidate block 320, and the fourth candidate block 340 in FIG. 3. Thus, the Greedy algorithm would relocate 995 data units (325+330+340). However, the data units from each candidate block would be likely to be unrelated to data units from the other candidate blocks. Thus, the Greedy algorithm would lead to increased data fragmentation in the memory.

In contrast, using an address-aware garbage collection process as described herein, data fragmentation in the memory may be reduced without greatly increasing processing burden (as indicated by a number of data units relocated). Using an address-aware garbage collection process, the set of candidate blocks 300 may be selected based on having a lowest number of valid data units of all the blocks of a memory, such as the memory 104 of FIG. 1. Among the set of candidate blocks 300, those blocks sharing related data based on representative LBA ranges may be selected for relocation. For example, referring to FIG. 3, the first candidate block 310 is associated with the representative LBA range (240). Likewise, the second candidate block 320 is associated with the representative LBA range (240). Additionally, the first candidate block 310 is associated with the representative LBA range (5), and the second candidate block 320 is associated with the representative LBA range (5). The third candidate block 330 is also associated with the representative LBA range (240) and the representative LBA range (5). Accordingly, the first candidate block 310, the second candidate block 320, and the third candidate block 330 have data units associated with several of the same representative LBA ranges. Accordingly, using an address-aware garbage collection process to select three candidate blocks for relocation, the first candidate block 310, the second candidate block 320, and the third candidate block 330 may be selected. In this example, 1040 valid data units (355+330+355) would be relocated using the address-aware garbage collection process.

Although more valid data units may be relocated using the address-aware garbage collection process (e.g., 1040 data units in FIG. 3) than using the Greed algorithm (e.g., 995 data units in FIG. 3), the valid data units which are relocated are more closely related based on the logical addresses of the data units. For example, the fifth candidate block 350, selected by the Greedy algorithm, has data units associated with the LBA range (120) and the LBA range (170); the second candidate block 320, selected by the Greedy algorithm, has data units associated with the LBA range (5) and the LBA range (240); and the fourth candidate block 340, selected by the Greedy algorithm, has data units associated with the LBA range (25). Accordingly, the fifth candidate block 350, the second candidate block 320, and the fourth candidate block 340 do not share any representative LBA range.

Accordingly, the address-aware garbage collection process enables the data storage device to perform garbage collection in a manner that does not significantly increase processing demands and reduces fragmentation of the memory. The address-aware garbage collection process may utilize LBA ranges or representative LBAs to improve processing time, as compared to comparing individual logical block addresses associated with each data unit.

Figure 4:
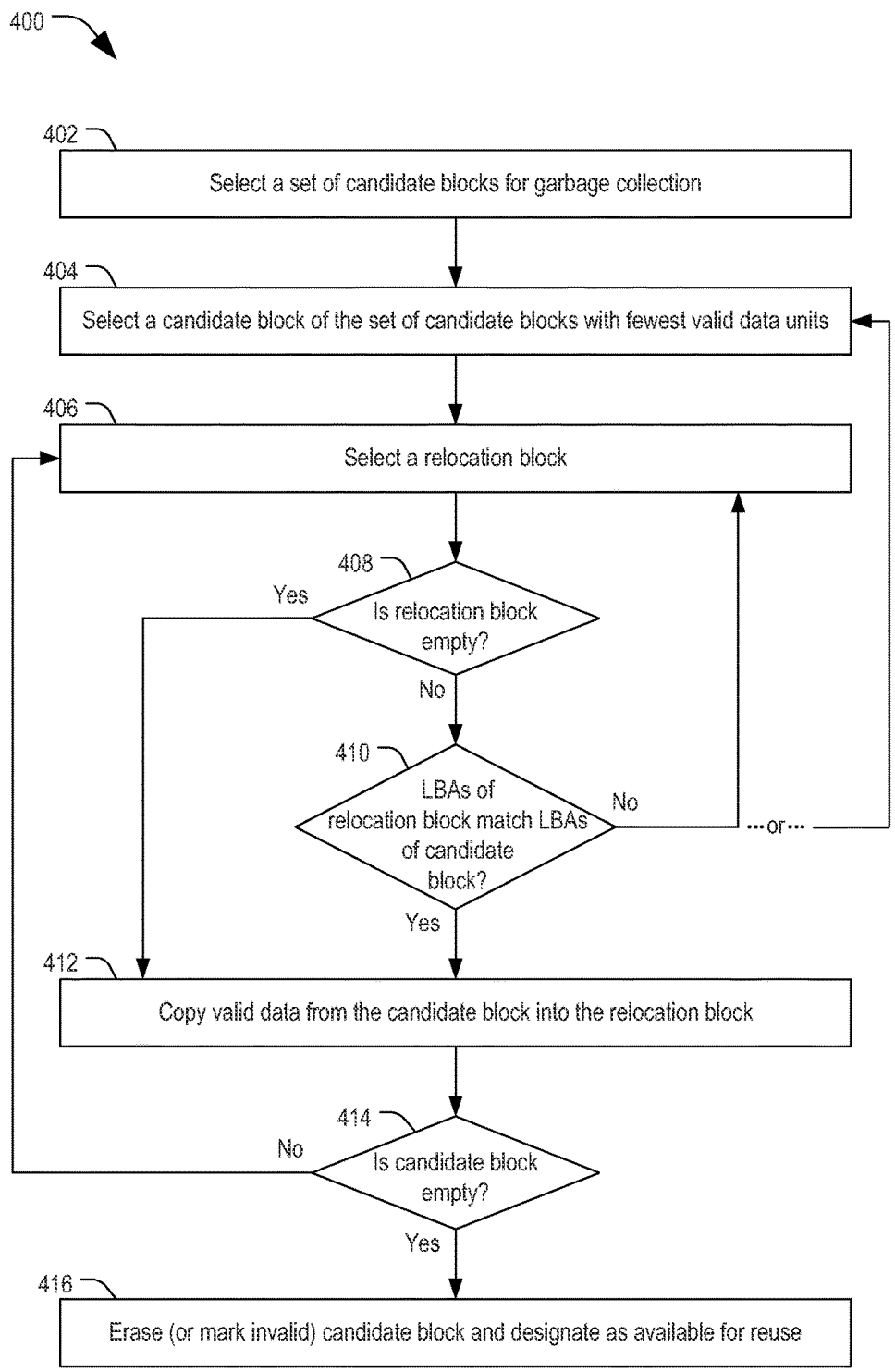
FIG. 4 is a flow diagram illustrating a first particular embodiment of a method of address-aware garbage collection at a data storage device.

FIG. 4 is a flow diagram illustrating a first particular embodiment of a method 400 of address-aware garbage collection at a data storage device. In a particular embodiment, the method 400 is performed by a controller of the data storage device. For example, the method 400 may performed by the controller 106 of the data storage device 102 of FIG. 1.

The method includes, at 402, selecting a set of candidate blocks for garbage collection. For example, the candidate block identification module 116 of FIG. 1 may select a set of candidate blocks from among the blocks 130 of the memory 104. In FIG. 1, the set of candidate blocks includes the first candidate block 140, the relocation block 150, and other candidate blocks 170. The set of candidate blocks may be selected based on a number of valid data units at each block 130 of the memory 104. The set of candidate blocks may include those blocks that have a smallest number of valid data units.

The method 400 also includes, at 404, selecting a candidate block of the set of candidate blocks with the fewest valid data units. For example, the garbage collection module 110 may select the first candidate block 140 based on the first candidate block 140 having the smallest number of valid data units among the first candidate block 140, the relocation block 150, and the other candidate blocks 170.

The method 400 also includes, at 406, selecting a relocation block. For example, the garbage collection module 110 may select the relocation block 150 from among the blocks 130 of the memory 104. The relocation block 150 may be selected based on a number of valid data units at the relocation block 150. In a particular embodiment, the relocation block 150 may be an empty block. In another particular embodiment, the relocation block may be a candidate block having the second smallest number of valid data units among the first candidate block 140, the relocation block 150, and the other candidate blocks 170.

The method 400 may include, at 408, determining whether the relocation block is empty. When the relocation block is empty, the method 400 includes copying valid data from the candidate block into the relocation block, at 412.

For example, if the relocation block 150 of FIG. 1 is empty, the data units 141, 142, 143 of the first candidate block 140 may be copied to the relocation block 150. When the relocation block is not empty, at 408, the method 400 may include determining whether logical block addresses (LBAs) of the relocation block match LBAs of the candidate block, at 410. For example, the LBA binning module 112 of FIG. 1 may associated LBA ranges with each of the candidate blocks 140, 150, 170 based on LBAs of data units of each block. The LBA range comparator 114 may determine whether LBA ranges of a particular candidate block (e.g., the first candidate block 140) correspond to LBA ranges of valid data units of the relocation block 150.

When the logical block addresses of the relocation block do not match logical block addresses of the candidate block, the method 400 may include selecting a new relocation block, at 406, or selecting a new candidate block of the set of candidate blocks, at 404. When the logical block addresses of the relocation block match the logical block address of the candidate block, the method 400 includes, at 412, copying valid data from the candidate block into the relocation block.

The method 400 may also include, at 414, determining whether the candidate block is empty (e.g., whether all of the valid data has been copied to another location, such as the relocation block). If copying the valid data from the candidate block to the relocation block has emptied the candidate block, the method 400 includes, at 416, erasing or marking as invalid data of the candidate block and designating the candidate block as available for re-use. If the candidate block is not empty after copying valid data from the candidate block into the relocation block, the method 400 may include, at 406, selecting another relocation block to which additional data may be copied. If additional candidate blocks of the set of candidate blocks are to be relocated (e.g., if one or more of the other candidate block 170 of FIG. 1 is to be relocated), the method 400 may return to 404 to select another candidate block of the set of candidate blocks for relocation.

Figure 5:
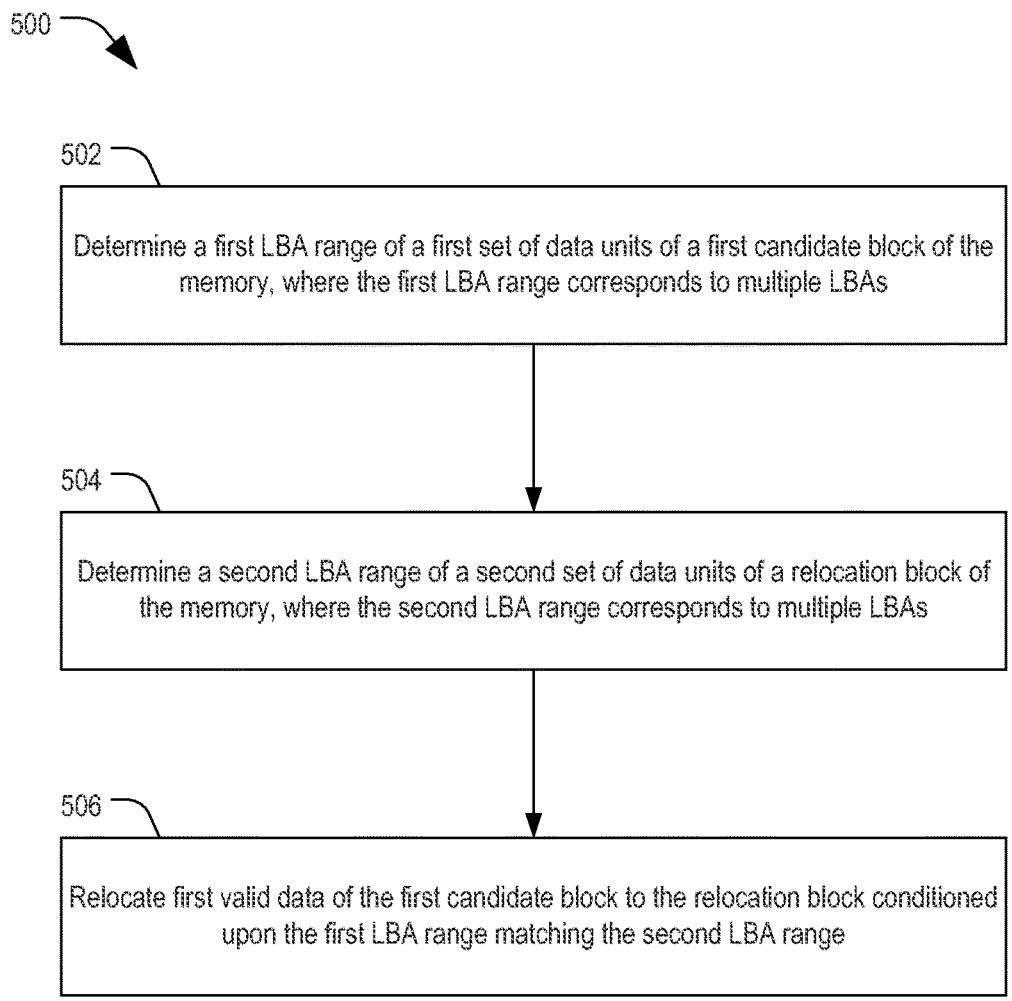
FIG. 5 is a flow diagram illustrating a second particular embodiment of a method of address-aware garbage collection at a data storage device.

FIG. 5 is a flow diagram illustrating a second particular embodiment of a method 500 of address-aware garbage collection at a data storage device. In a particular embodiment, the method 500 is performed by a controller of the data storage device. For example, the method 500 may performed by the controller 106 of the data storage device 102 of FIG. 1.

The method 500 includes, at 502, determining a first logical block address (LBA) range of a first set of data units of a first candidate block of the memory and, at 504, determining a second LBA range of a second set of data units of a relocation block of the memory. The first LBA range and the second LBA range each correspond to multiple LBAs. For example, the controller 106, the garbage collection module 110, or the LBA binning module 112 of FIG. 1 may determine LBAs associated with valid data units of the first candidate block 140, the relocation block 150 and the other candidate blocks 170. In a particular embodiment, the first LBA range and the second LBA range may be representative LBA ranges, as described above.

The method 500 also includes, at 506, determining, based on whether the first LBA range matches the second LBA range, whether to relocate first valid data of the first candidate block to the relocation block of the memory, and, at 508, relocating the first valid data of the first candidate block to the relocation block of the memory in response to determining that the first LBA range matches the second LBA range. For example, the LBA range comparator 114 of FIG. 1 may compare LBA ranges associated with the first candidate block 140, the relocation block 150, the other candidate blocks 170, or a combination thereof, to identify LBA range matches. To simplify a search for LBA range matches, the controller 106, the garbage collection module 110, or the LBA binning module 112 may assign representative LBA ranges to one or more candidate blocks (e.g., if the number of data units associated with a particular LBA range is greater than or equal to a threshold number). The controller 106 or the garbage collection module 110 of FIG. 1 may relocate valid data units from the first candidate block 140 to the relocation block 150 to consolidate related data.

Figure 6:
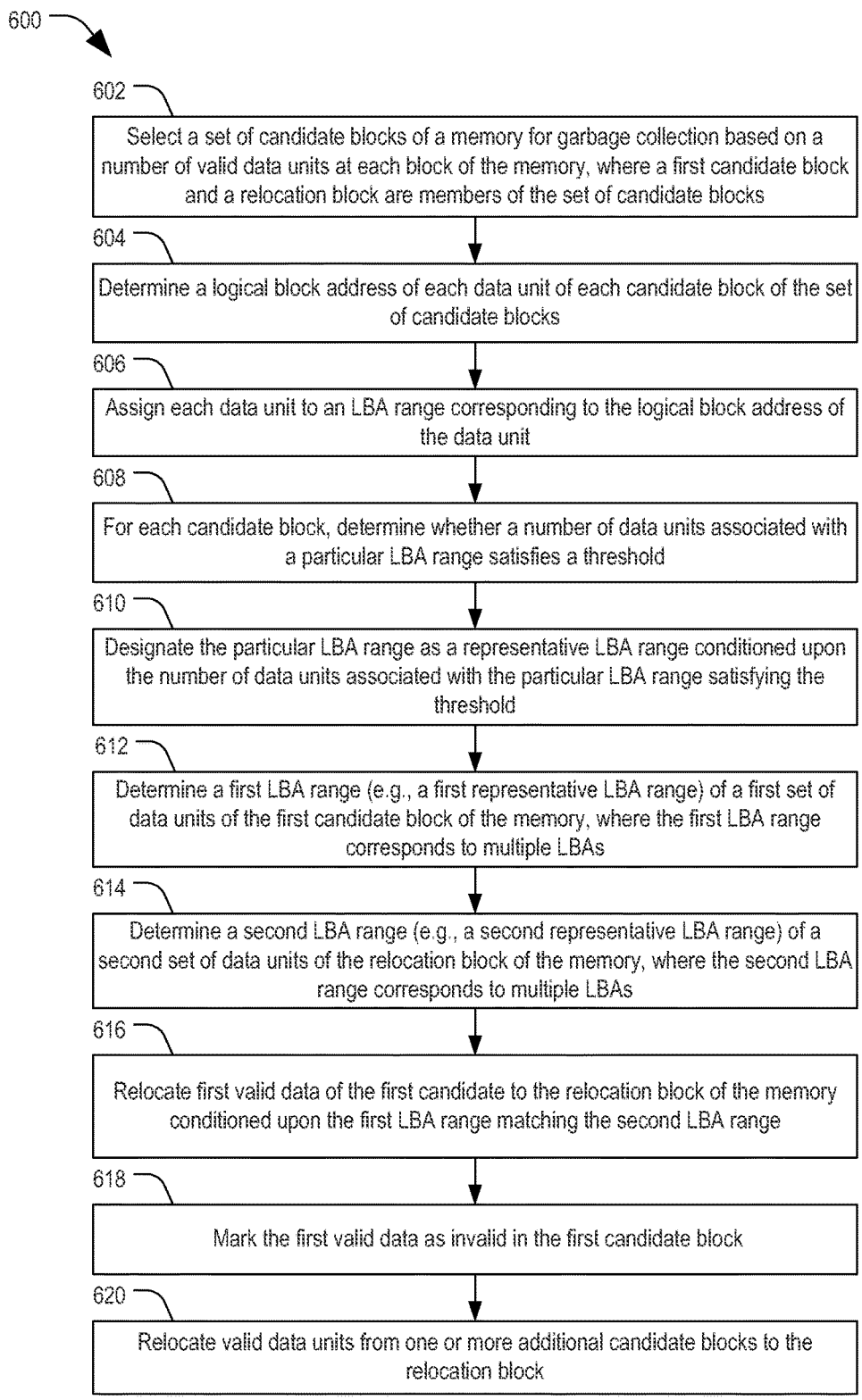
FIG. 6 is a flow diagram illustrating a third particular embodiment of a method of address-aware garbage collection at a data storage device.

FIG. 6 is a flow diagram illustrating a third particular embodiment of a method 600 of address-aware garbage collection at a data storage device. In a particular embodiment, the method 600 is performed by a controller of the data storage device. For example, the method 600 may be performed by the controller 106 of the data storage device 102 of FIG. 1.

The method 600 includes, at 602, selecting a set of candidate blocks of the memory for garbage collection based on a number of valid data units at each block of the memory. The set of candidate blocks may correspond to blocks of the memory that have fewest valid data units. For example, the candidate block identification module 116 of FIG. 1 may select the first candidate block 140, the relocation block 150, and the other candidate blocks 170 from among the blocks 130. The candidate block identification module 116 may also, or in the alternative, designate the non-candidate blocks 180 as not being candidate blocks, thereby indicating that other blocks are candidate blocks.

The method 600 includes, at 604, determining a logical block address (LBA) of each data unit of each candidate block of the set of candidate blocks. For example, the LBA binning module 112 of FIG. 1 may use the logical-to-physical address table 118 to identify a LBA associated with each data unit. The method 600 also includes, at 606, assigning each data unit to an LBA range corresponding to the LBA of the data unit. For example, the LBA binning module 112 of FIG. 1 may assign each data unit of the candidate blocks 140, 150 and 170 to a corresponding LBA range.

The method 600 may include, at 608, determining whether a number of data units associated with a particular LBA range satisfies a threshold and, at 610, designating the particular LBA range as a representative LBA range conditioned upon the number of data units associated with the particular LBA range satisfying the threshold. For example, the garbage collection module 110 may compare a number of data units associated with each LBA range to a threshold number. When the number of data units of a particular candidate block associated with a particular LBA range is greater than or equal to the threshold number, the particular LBA range may be designated as a representative LBA range for the particular candidate block. In a particular embodiment, the number of representative LBA ranges designated for any particular candidate block may be relatively small to reduce processing time used to compare LBA ranges. For example, in some implementations, fewer than five representative LBA ranges are designated per candidate block.

The method 600 includes, at 612, determining a first LBA range of a first set of data units of a first candidate block (e.g., a member of the set of candidate blocks) of the memory and, at 614, determining a second LBA range of a second set of data units of a relocation block (e.g., another member of the set of candidate blocks) of the memory. The first LBA range and the second LBA range each correspond to multiple LBAs. The first LBA range and the second LBA range may each be a representative LBA range.

In a particular embodiment, the first candidate block and the relocation block are selected from the set of candidate blocks based on a number of valid data bits at each candidate block. For example, the first candidate block may be a candidate block that has a least number of valid data units among the set of candidate blocks, and the relocation block may be a candidate block that has a second least number of valid data units among the set of candidate blocks. In another particular embodiment, the first candidate block and the relocation block are selected from the set of candidate blocks based on a number data units associated with LBA ranges of each candidate block of the set of candidate blocks. For example, the first candidate block may include a first number of data units associated with the first LBA range, where the first number is a largest number of data units associated with any particular LBA range among the set of candidate blocks. In this example, the relocation block may include a second number of data units associated with the second LBA range, where the second number is a second largest number of data units associated with any particular LBA range among the set of candidate blocks. To illustrate, the first candidate block may have more data units that are associated with a single LBA range than any other candidate block, and the relocation block may have more data units that are associated with a single LBA range than any other candidate block except the first candidate block.

The method 600 includes, at 616, relocating first valid data of the first candidate block to the relocation block of the memory conditioned upon the first LBA range matching the second LBA range. For example, the controller 106, the garbage collection module 110, or the LBA range comparator 114 of FIG. 1 may compare LBA ranges associated with the first candidate block 140, the relocation block 150, the other candidate blocks 170, or a combination thereof, to identify LBA range matches. To simplify a search for LBA range matches, the controller 106, the garbage collection module 110, or the LBA binning module 112 may assign representative LBA ranges to one or more candidate blocks (e.g., if the number of data units associated with a particular LBA range is greater than or equal to a threshold number). The controller 106 or the garbage collection module 110 of FIG. 1 may relocate valid data units from the first candidate block 140 to the relocation block 150 to consolidate related data.

The method 600 includes, at 618, after relocating the first valid data to the relocation block, marking the first valid data as invalid in the first candidate block. For example, the controller 106 or the garbage collection module 110 may mark the data units 141-143 of the first candidate block 140 as invalid after copying the data units 141-143 to the relocation block 150. The method 600 may also include, at 620, relocating valid data units from one or more additional candidate blocks to the relocation block. For example, after relocating the data units 141-143 of the first candidate block 140, one or more of the valid data units 172 of one or more of the other candidate block 170 may be selected for relocation to the relocation block 150.

Although various components depicted herein are illustrated as block components and described in general terms, such components may include one or more microprocessors, state machines, or other circuits configured to enable a data storage device, such as the data storage device 102 of FIG. 1, to perform the particular functions attributed to such components, or any combination thereof. For example, the controller 106 of FIG. 1 may represent physical components, such as controllers, state machines, logic circuits, or other structures to instruct the garbage collection module 110, the LBA binning module 112, the LBA range comparator 114, the candidate block identification module 116, or a combination thereof, to perform address-aware garbage collection.

The controller 106 may be implemented using a microprocessor or microcontroller programmed to generate the compressed data. In a particular embodiment, the controller 106 includes a processor executing instructions that are stored at the memory 104. Alternatively, or in addition, executable instructions that are executed by the processor may be stored at a separate memory location that is not part of the memory 104, such as at a read-only memory (ROM) (not shown).

In a particular embodiment, the data storage device 102 may be attached or embedded within one or more host devices, such as within a housing of a portable communication device. For example, the data storage device 102 may be within a packaged apparatus, such as a wireless telephone, a personal digital assistant (PDA), gaming device or console, a portable navigation device, or other device that uses internal non-volatile memory. However, in other embodiments, the data storage device 102 may be a portable device configured to be selectively coupled to one or more external devices. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a Resistive Random Access Memory (RRAM or ReRAM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
at a data storage device that includes a controller and a memory, performing:
initiating a garbage collection procedure based on allocating a plurality of logical block address (LBA) ranges in a logical address space associated with a relocation block of the memory;
after initiating the garbage collection procedure, determining a first LBA range of a first set of data units stored at a first candidate block of the memory;
determining a second LBA range of a second set of data units of the relocation block, wherein the second LBA range is included in the plurality of LBA ranges;
determining that the first LBA range matches the second LBA range; and
relocating first valid data of the first candidate block to the relocation block in response to determining that the first LBA range matches the second LBA range, wherein the first LBA range corresponds to multiple LBAs.

2. The method of claim 1, wherein the logical address space is divided into LBA ranges of equal size before determining the second LBA range.

3. The method of claim 2, wherein a first number of data units of the first candidate block is associated with the first LBA range and a second number of data units of the relocation block is associated with the second LBA range, and wherein the first number is a largest number of data units associated with any particular LBA range among a plurality of candidate blocks and the second number is a second largest number of data units associated with any particular LBA range among the plurality of candidate blocks.

4. The method of claim 2, further comprising:
determining a logical block address of each data unit of each candidate block of a plurality of candidate blocks; and
assigning each data unit to a LBA range corresponding to the logical block address of the data unit.

5. The method of claim 4, further comprising, for each candidate block of the plurality of candidate blocks:
determining whether a number of data units associated with a particular LBA range satisfies a threshold; and
designating the particular LBA range as a representative LBA range conditioned upon the number of data units associated with the particular LBA range satisfying the threshold, wherein the first LBA range and the second LBA range are representative LBA ranges.

6. The method of claim 5, wherein fewer than five representative LBA ranges are designated per candidate block.

7. The method of claim 1, further comprising selecting a plurality of candidate blocks of the memory for the garbage collection procedure based on a number of valid data units at each block of the memory, the plurality of candidate blocks corresponding to blocks of the memory having fewest valid data units, wherein the first candidate block is a member of the plurality of candidate blocks and has a least number of valid data units among the plurality of candidate blocks, and wherein the relocation block has a second least number of valid data units among the plurality of candidate blocks.

8. The method of claim 1, further comprising relocating valid data units from one or more additional candidate blocks to the relocation block.

9. The method of claim 1, further comprising, after relocating the first valid data to the relocation block, marking the first valid data as invalid in the first candidate block.

10. A data storage device comprising:
a controller; and
a memory coupled to the controller, wherein the controller is configured to:
initiate a garbage collection procedure based on allocating a plurality of logical block address (LBA) ranges in a logical address space associated with a relocation block of the memory;
after initiating the garbage collection procedure, determine a first LBA range of a first set of data units stored at a first candidate block of the memory;

determine a second LBA range of a second set of data units of the relocation block, wherein the second LBA range is included in the plurality of LBA ranges;

determine that the first LBA range matches the second LBA range; and relocate first valid data of the first candidate block to the relocation block in response to determining that the first LBA range matches the second LBA range, wherein the first LBA range corresponds to multiple LBAs.

11. The data storage device of claim 10, wherein the controller is further configured to select a plurality of candidate blocks of the memory for the garbage collection procedure based on a number of valid data units at each block of the memory, wherein the first candidate block and the relocation block are members of the plurality of candidate blocks.

12. The data storage device of claim 11, wherein the plurality of candidate blocks corresponds to blocks of the memory that have fewest valid data units.

13. The data storage device of claim 11, wherein the first candidate block has a least number of valid data units among the plurality of candidate blocks and the relocation block has a second least number of valid data units among the plurality of candidate blocks.

14. The data storage device of claim 11, wherein a first number of data units of the first candidate block is associated with the first LBA range and a second number of data units of the relocation block is associated with the second LBA range, and wherein the first number is a largest number of data units associated with any particular LBA range among the plurality of candidate blocks and the second number is a second largest number of data units associated with any particular LBA range among the plurality of candidate blocks.

15. The data storage device of claim 11, wherein the controller is further configured to:

determine a logical block address of each data unit of each candidate block of the plurality of candidate blocks; and assign each data unit to a LBA range corresponding to the logical block address of the data unit.

16. The data storage device of claim 15, wherein the controller is further configured to, for each candidate block of the plurality of candidate blocks:

determine whether a number of data units associated with a particular LBA range satisfies a threshold; and designate the particular LBA range as a representative LBA range conditioned upon the number of data units associated with the particular LBA range satisfying the threshold, wherein the first LBA range and the second LBA range are representative LBA ranges.

17. The data storage device of claim 16, wherein fewer than five representative LBA ranges are designated per candidate block.

18. The data storage device of claim 10, wherein the controller is further configured to:

relocate valid data units from one or more additional candidate blocks to the relocation block; and after relocating the valid data units to the relocation block, mark the valid data units as invalid in the one or more additional candidate blocks.

19. A method comprising:

at a data storage device that includes a controller and a memory, performing:

determining a logical block address (LBA) range of each of a plurality of sets of data units stored at each of a plurality of blocks of the memory;

identifying a first block of the plurality of blocks and a second block of the plurality of blocks, the first block and the second block including more data units that are associated with at least one particular LBA range than other blocks of the plurality of blocks; and relocating valid data from the first block to the second block responsive to at least one LBA range associated with the first block matching at least one LBA range associated with the second block.

20. A data storage device comprising:

means for storing information;

means for controlling the means for storing, wherein the means for controlling is configured to:

initiate a garbage collection procedure based on allocating a plurality of logical block address (LBA) ranges in a logical address space associated with a relocation block of the means for storing;

after initiating the garbage collection procedure, determine a first LBA range of a first set of data units stored at a first candidate block of the means for storing;

determine a second LBA range of a second set of data units of the relocation block, wherein the second LBA range is included in the plurality of LBA ranges;

determine that the first LBA range matches the second LBA range; and relocate first valid data of the first candidate block to the relocation block in response to determining that the first LBA range matches the second LBA range, wherein the first LBA range corresponds to multiple LBAs.

* * * * *